United States Patent
Morishita

[11] Patent Number: 5,937,219
[45] Date of Patent: Aug. 10, 1999

[54] SLIDING COVER RESTRICTING DEVICE INCLUDING A GEAR TRAIN

[75] Inventor: Shigeru Morishita, Tokyo, Japan

[73] Assignee: Asahi Kogaku Kogyo Kabushiki Kaisha, Tokyo, Japan

[21] Appl. No.: 09/120,891

[22] Filed: Jul. 23, 1998

Related U.S. Application Data

[62] Division of application No. 08/885,854, Jun. 30, 1997, Pat. No. 5,822,634, which is a division of application No. 08/714,993, Sep. 17, 1996, Pat. No. 5,708,884.

[30] Foreign Application Priority Data

Sep. 21, 1995 [JP] Japan ..................................... 7-243398
Sep. 22, 1995 [JP] Japan ..................................... 7-244681
May 21, 1996 [JP] Japan ..................................... 8-125558

[51] Int. Cl.[6] .................................................. G03B 17/04
[52] U.S. Cl. ........................................... 396/349; 396/448
[58] Field of Search ..................................... 396/348, 349, 396/439, 448, 534, 535

[56] References Cited

U.S. PATENT DOCUMENTS

| | | | |
|---|---|---|---|
| 4,522,478 | 6/1985 | Kando et al. | 396/448 |
| 4,525,046 | 6/1985 | Takaoka et al. | 396/117 |
| 5,461,441 | 10/1995 | Kotani | 396/349 |
| 5,594,523 | 1/1997 | Fujisaki | 396/448 |
| 5,617,167 | 4/1997 | Kaji | 396/448 |

FOREIGN PATENT DOCUMENTS

| | | |
|---|---|---|
| 1-255839 | 10/1989 | Japan . |
| 1-288842 | 11/1989 | Japan . |

*Primary Examiner*—Safet Metjahic
*Assistant Examiner*—J. K. Han
*Attorney, Agent, or Firm*—Greenblum & Bernstein P.L.C.

[57] ABSTRACT

A device for restricting a movement of a sliding cover of a camera includes a photographing lens which is movable between a photographing position and a retracted position. A sliding cover is movable between fully-closed and photographing positions, at which the sliding cover covers the photographing lens when the photographing lens is at the retracted position and does not cover the photographing lens when the photographing lens is at the photographing position, respectively. An engaging member can move between an engaging position at which it can engage the sliding cover, when the sliding cover is at the fully-opened position and a releasing position at which the sliding cover is released. A gear train moves the engaging member in accordance with rotations of a motor, and a clutch gear forms a power transmission system between the motor and the photographing lens when the engaging member moves to the engaging position, and cuts the power transmission system when the engaging member moves to the releasing position.

5 Claims, 9 Drawing Sheets

SLIDING COVER RESTRICTING DEVICE INCLUDING A GEAR TRAIN

This application is a division of application Ser. No. 08/885,854, filed Jun. 30, 1997 now U.S. Pat. No. 5,822,634, which is a Divisional of application Ser. No. 08/714,993 filed Sep. 17, 1996, now U.S. Pat. No. 5,708,884 both of which are incorporated by reference herein in their entireties.

BACKGROUND OF THE INVENTION

1. Field of the Invention

The present invention relates to a device for restricting a movement of a sliding cover of a camera. The sliding cover is used to protect a photographing lens of the camera.

2. Description of the Related Art

Recently, so-called capsule-type cameras have been produced. Such a type of camera is usually provided with a sliding cover to protect a photographing lens from dirt or impact, when the photographing lens is in a retracted position; that is, when the camera is not being operated (or when a picture is not being taken). In addition, the portability of the camera can be improved, since the photographing lens is covered by the sliding cover.

When the sliding cover is slid to an opened position, the actuating switch (main switch of the camera) is turned ON and the photographing lens is advanced to a photographing position; that is, namely, the camera is capable of photographing. In this state, if the sliding cover is moved toward the closed position to cover the photographing lens, the actuating switch is turned OFF, and the photographing lens is moved to a retracted position. Accordingly, when the photographing lens is completely retracted, the sliding cover can be completely closed.

If a photographer attempts to close the sliding cover from the fully-opened state to the fully-closed state using an excessive force for a prolonged period of time, if the photographing lens is not completely retracted to the retracted position, the possibility exists that the sliding cover may interfere with the photographing lens. Since the sliding cover has to be moved by a predetermined toward the closed position in order to actuate the lens actuating motor, it is necessary to lock the sliding cover to prevent further movement before the photographing lens has completely retracted. The actuating force of the photographing lens during advancing or retracting thereof, is generally utilized for restricting a movement of the sliding cover.

A conventional sliding cover movement restricting device utilizing a locking pawl is known per se. In such a device, when the sliding cover is moved to the opened position, the locking pawl moves to a position capable of locking the sliding cover at the opened position, according to the advancement of the photographing lens. When the photographing lens is retracted, an actuating force is generated through forward and rearward movements of the photographing lens. The actuating force is then applied to the locking pawl via an interlocking device (e.g., a gear train). Accordingly, the locking pawl is moved to the locking release position which is in a direction opposite to the locking position.

With such a device, during a movement of the photographing lens from the photographing (operational) position to the retracted position, if a photographer mistakenly applies a strong force to the sliding cover in the closing direction, since the sliding cover is engaged with the locking pawl, the locking pawl is strongly pressed at the locking position. In such a state, if the photographing lens reaches the retracted position, the interlocking device applies an excessive force to the locking pawl which is in a fixed state. Therefore, the interlocking device, or the actuating system of the photographing lens, may receive the excessive force, and this may lead to damage or an operational error. In addition, once the sliding cover is opened, if the photographer mistakenly applies a force to close the sliding cover, the possibility exists that the photographing lens interferes with the sliding cover.

SUMMARY OF THE INVENTION

In view of the above-mentioned problems, an object of the present invention is to provide a device for restricting a movement of the sliding cover which can certainly avoid an operational error or damage, which may be caused when a photographer mistakenly applies an excessive force to the sliding cover during opening of the sliding cover, and which further applies an excessive force to the interlocking device or the actuating system of the photographing lens.

Yet another object of the present invention is to provide a device for engaging the sliding cover under the condition that once the sliding cover is opened, the photographer immediately applies a force to close the sliding cover.

In order to achieve the above-mentioned objects according to an aspect of the present invention, a device for restricting a movement of a sliding cover of a camera is provided having a photographing lens which is movable between a photographing position and a retracted position. A sliding cover is movable between fully-closed and photographing positions. The sliding cover covers the photographing lens when the photographing lens is at the retracted position and does not cover the photographing lens when the photographing lens is at the photographing position, respectively. A locking lever can move to a position at which it can engage a locking section of the sliding cover, when the sliding cover is at the fully-opened position. A lock releasing member is actuated when the photographing lens moves to the retracted position. An intermediate member is actuated by an actuating force of the lock releasing member. A clutch mechanism, provided between the locking lever and the intermediate member, rotatively moves the locking lever and the intermediate member together to a lock releasing position when a force applied to the locking lever is less than a predetermined value. The clutch mechanism allows the intermediate member to run idle relative to the locking lever when the force exceeds the predetermined value.

Preferably, a first torsion spring is positioned between the intermediate member and the locking lever.

The intermediate member can be an intermediate lever pivoted coaxially with the locking lever. An engaging projection can be provided on either the intermediate lever or the locking lever. The intermediate lever and the locking lever are maintained in a relative rotative state in a predetermined angle by the first torsion spring. The intermediate lever and the locking lever rotate together as a whole while maintaining the relative rotative state.

Preferably, a second torsion spring applies a rotative force to bias the locking lever and the intermediate lever toward the locking position. The rotative force of the second torsion spring is less than a rotative force of the first torsion spring.

According to another aspect of the present invention, a device for restricting a movement of a sliding cover of a camera is provided. The device includes a photographing lens which is movable between photographing and retracted positions. A sliding cover includes a locking section and is movable between a fully-closed position at which the sliding cover covers the photographing lens when the photographing lens is at the retracted position, and a fully-opened position at which the sliding cover does not cover the photographing lens when the photographing lens is at the photographing position. A locking lever, pivotally supported to a body of the camera, is engageable with the locking section of the sliding cover. A spring device biases the locking lever toward a locking position. A lock releasing member is rotated when the photographing lens is moved to the retracted position. An intermediate lever, pivoted coaxially with the locking lever, receives a rotative force of the lock releasing member. A clutch mechanism, provided between the locking lever and the intermediate lever, rotatively moves the locking lever together with the intermediate lever to a lock releasing position when a force applied to the locking lever is less than a predetermined value. The clutch mechanism allows the intermediate lever to run idle relative to the locking lever when the force exceeds the predetermined value.

According to yet another aspect of the present invention, a device for restricting a movement of a sliding cover of a camera is provided. The device includes a photographing lens which is movable between a photographing position and a retracted position. A sliding cover having a locking section, is movable between a fully-closed position at which the sliding cover covers the photographing lens when the photographing lens is at the retracted position, and a fully-opened position at which the sliding cover does not cover the photographing lens when the photographing lens is at the photographing position. A locking lever is movable to a position so as to be capable of engaging the locking section of the sliding cover when the sliding cover is at the fully-opened position. A rotative member rotates when the photographing lens is moved to the retracted position. A lock releasing member, coaxially pivoted with the rotative member, is engagable with the locking lever. A clutch mechanism, provided between the locking lever and the rotative member, rotatively moves the locking lever together with the rotative member to a lock releasing position when a force applied to the locking lever is less than a predetermined value. The clutch mechanism allows the rotative member to run idle relative to the locking lever when the force exceeds the predetermined value.

Preferably, the rotative member is a locking operational gear which is pivoted to a body of the camera and rotates in a locking direction and a lock releasing direction by receiving an actuating force from the photographing lens during a movement of the photographing lens between the photographing position and the retracted position. The lock releasing member can be a cam member which is coaxially pivoted to the locking operational gear and capable of relative rotation with the locking operational gear.

The locking operational gear can be an engaging section which engages the cam member in respective different relative angles with each other in the locking direction and the lock releasing direction. A first torsion spring is preferably provided between the locking operational gear and the cam member. The locking operational gear and the cam member are maintained in a relative rotative state towards the lock releasing direction by the first torsion spring until the cam member is engaged by the engaging member. The locking operational gear and the cam member generally rotate as a whole together, maintaining the relative rotative state.

A second torsion spring can be provided to apply a rotative force to the locking lever towards the locking position. The rotative force of the second torsion spring is less than a rotative force of the first torsion spring.

In a further aspect of the present invention, a device for restricting a movement of a sliding cover of a camera is provided. The device includes a photographing lens which is movable along an optical axis between a photographing position and a retracted position. A sliding cover is movable between a fully-closed position ahead of the photographing lens, and a fully-opened position at which the photographing lens is moved to the photographing position. A switch actuates a motor to rotate in clockwise and counterclockwise directions according to a sliding operation of the sliding cover between the fully-closed and fully-opened positions. An engaging member is movable between an engaging position at which the sliding cover is engaged at the fully-opened position, and a releasing position at which the sliding cover is released. A gear train moves the engaging member between the engaging and the fully-opened positions in accordance with the clockwise and counterclockwise rotations of the motor. A clutch gear, moving interlocked with a movement of the engaging member, forms a power transmission system between the motor and the photographing lens when the engaging member moves to the engaging position, and cuts the power transmission system when the engaging member moves to the fully-opened position.

In still a further aspect of the present invention, a device for restricting movement of a sliding cover of a camera is provided. The device includes a photographing lens which is movable forwardly and rearwardly along an optical axis between a photographing position and a retracted position. A sliding cover is capable of moving between a fully-closed position ahead of the photographing lens, and a fully-opened position at which the photographing lens is moved to the photographing position. An engaging member moves between an engaging position at which the sliding cover is engaged at the fully-opened position and a releasing position at which the sliding cover is released. An actuating motor is commonly used for the photographing lens and the engaging member. A sliding cover actuating gear mechanism moves the engaging member to the engaging position via the actuating motor, when the sliding cover is moved to the fully-opened position. A photographing lens actuating gear mechanism connects the actuating motor to the photographing lens via the sliding cover actuating gear mechanism, when the engaging member is moved to the engaging position.

Preferably during the movement of the sliding cover from the fully-opened position to the fully-closed position, the engaging member is moved to the releasing position after the actuating motor moves the photographing lens to the retracted position.

The present disclosure relates to subject matter contained in Japanese Patent Applications No. 7-243398 (filed on Sep. 21, 1995), No. 7-244681 (filed on Sep. 22, 1995) and No. 8-125558 (filed on May 21, 1996) which are expressly incorporated herein by reference in their entireties.

BRIEF DESCRIPTION OF THE DRAWINGS

The present invention will be described in greater detail with reference to the accompanying drawings, in which similar reference numerals indicate similar elements, and wherein.

DESCRIPTION OF THE PREFERRED EMBODIMENTS

FIGS. 1 through 6 illustrate a sliding cover movement restricting device for a camera, according to a first embodiment of the present invention.

Figure 1:
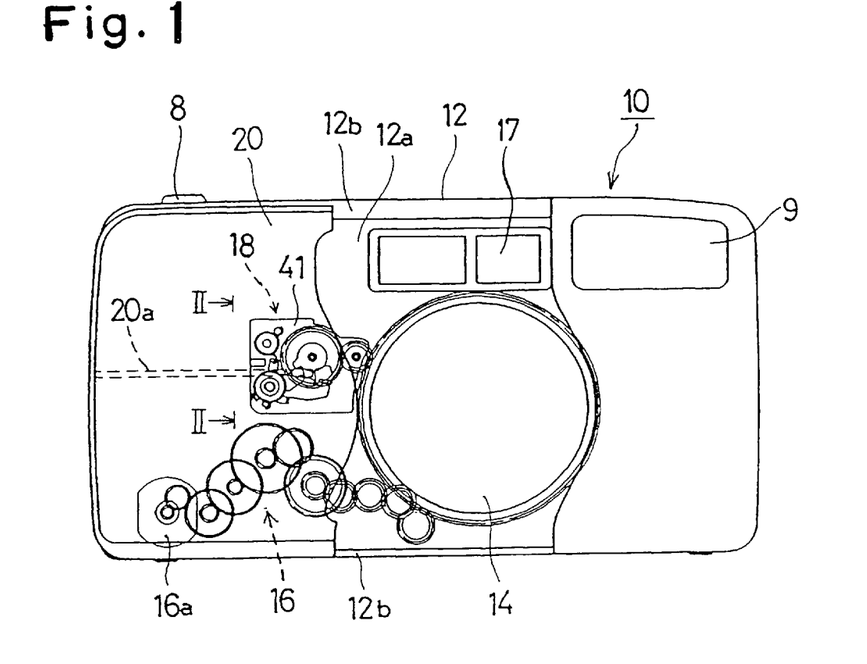
FIG. 1 is a front elevational view showing a camera having a device for restricting a movement of a sliding cover, according to a first embodiment of the present invention.

FIG. 1 is a front elevational view of a so-called capsule-type camera 10 having a sliding cover 20 in a fully-opened state. The sliding cover 20 covers a photographing lens 14 when the photographing lens 14 is in a non-operational state. When the sliding cover 20 is opened, an unillustrated actuating switch (main switch) is turned ON, and accordingly the photographing lens 14 is advanced to a position at which the camera 10 is ready to take a photograph (hereinafter referred to as the "photographing position"). Furthermore, if the sliding cover 20 is moved from the open position toward the closed position, the actuating switch is turned OFF, and accordingly the photographing lens 14 is moved to the retracted position.

The camera 10 has a camera body 12. The photographing lens 14, a strobe device 9 and a finder window 17 are provided on a front wall 12a of the camera body 12. The camera 10 is also provided with a shutter button 8 on an upper surface thereof.

Guide grooves 12b are provided on upper and lower portions of the front wall 12a. The guide grooves 12b extend in a direction perpendicular to an optical axis of the photographing lens 14; that is, along a longitudinal direction of the front wall 12a. The sliding cover 20 is guided, at upper and lower ends thereof, by the guide grooves 12b such that the sliding cover 20 is capable of moving in the direction perpendicular to the optical axis of the photographing lens 14. Accordingly, the sliding cover 20 can move between two positions; that is, a fully-closed position at which the sliding cover 20 covers the photographing lens 14 when the photographing lens 14 is at the retracted position, and a fully-opened position at which the photographing lens 14 is uncovered.

The sliding cover 20 is engaged by a predetermined force of an unillustrated click-stop device at both the fully-opened and the fully-closed positions. A force greater than the predetermined force is necessary to move the sliding cover 20 from either the fully-opened position to the fully-closed position, or from the fully-closed position to the fully-opened position.

The sliding cover 20 is provided with a rib (i.e., a locking portion) 20a which is positioned at substantially a center of the vertical direction of a rear surface of the sliding cover 20, and is elongated in the longitudinal direction of the front wall 12a of the camera body 12.

A large diameter zoom interlocking gear 22a is provided in the camera body 12 surrounding the photographing lens 14. The rotational axis of the zoom interlocking gear 22a coincides with the optical axis of the photographing lens 14. The camera body 12 is further provided with a zoom motor 16a and a zoom gear train 16. The zoom gear train 16 transmits a rotation of the zoom motor 16a to the zoom interlocking gear 22a to actuate a forward or rearward movement of the photographing lens 14 in the optical axis direction. Thus a zooming operation of the photographing lens 14 can be performed.

The camera body 12 is provided with a device (hereinafter referred to as a sliding cover movement restricting device) 18 for restricting movement of the sliding cover 20 of the camera 10. The sliding cover movement restricting device 18 is positioned on the same side of the camera body 12 as the sliding cover 20 when the sliding cover 20 is at the fully-opened position. When the sliding cover 20 is positioned at the fully-opened position, the sliding cover movement restricting device 18 either locks or releases the sliding cover 20, according to a movement of the photographing lens 14.

Figure 2:
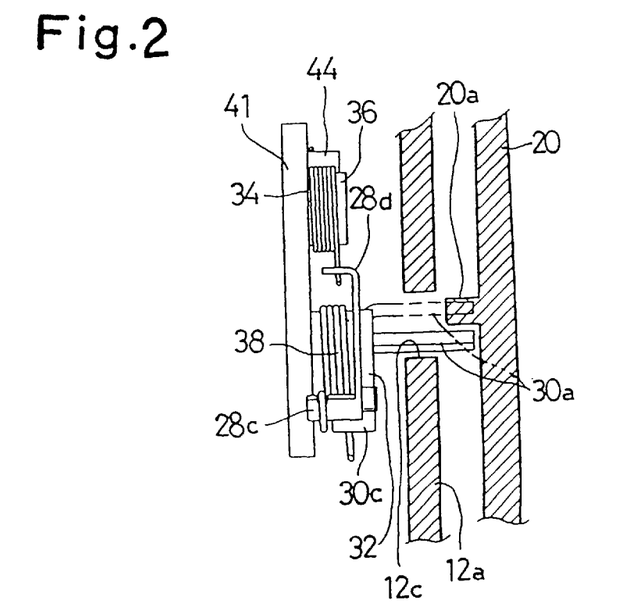
FIG. 2 is a longitudinal sectional view taken along the line II—II of FIG. 1.
Figure 3:
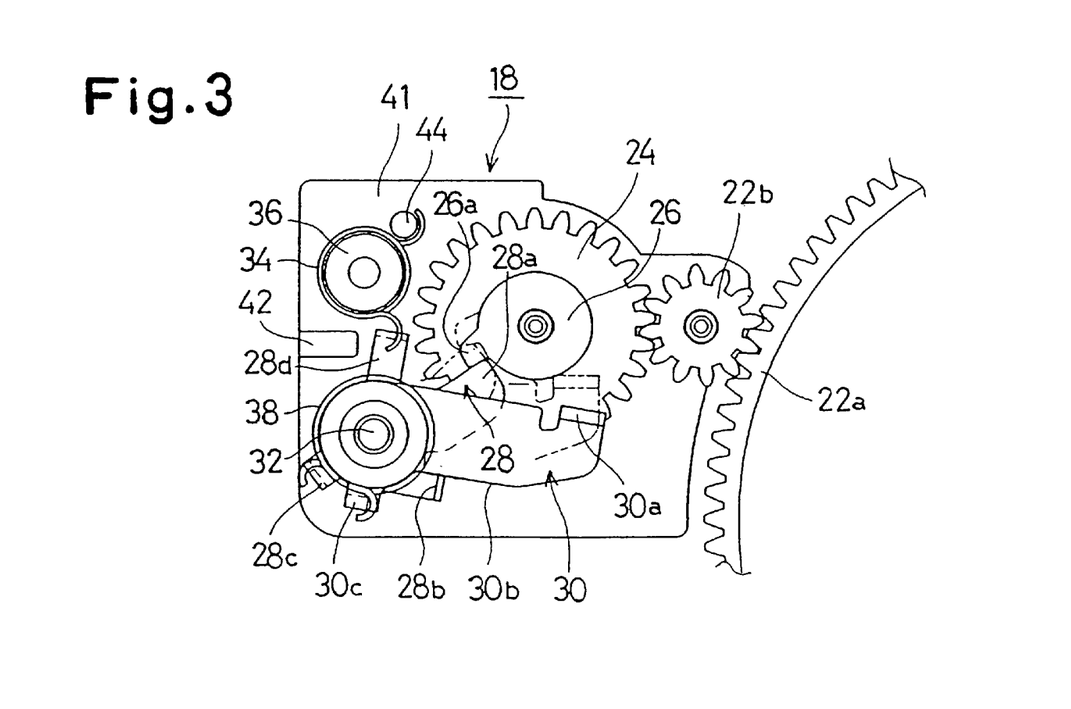
FIG. 3 is an enlarged schematic view of the device for restricting a movement of the sliding cover shown in FIG. 1.

The sliding cover movement restricting device 18 is provided with a unit plate 41. The unit plate 41 is fixed to the camera body 12 adjacent to the photographing lens 14. Specifically, the unit plate 41 is fixed to an inner surface of the front wall 12a of the camera body 12, as shown in FIG. 2. An idle gear 22b and a cam attached gear 24 are rotatively supported on the unit plate 41. The idle gear 22b engages the zoom interlocking gear 22a, as can be seen in FIG. 3. The cam attached gear 24, having a diameter larger than the idle gear 22b, engages the idle gear 22b. A cam 26, including an engaging projection 26a, is coaxially secured to the cam attached gear 24. A locking lever 30 and an intermediate lever 28 are coaxially supported on the unit plate 41 via a pivot 32.

The locking lever 30 is provided with a locking pawl 30a and a spring hook 30c. The locking pawl 30a is positioned at a free end of an arm of the locking lever 30. The spring hook 30c is positioned near the pivot 32 of the locking lever 30. The spring hook 30c projects perpendicularly from the main section (arm) of the locking lever 30. The locking pawl 30a is elongated and bent towards the sliding cover 20, so that the locking pawl 30a projects into the sliding cover 20 through a projection bore 12c which is formed on the front wall 12a, as can be seen in FIG. 2.

When the locking lever 30 rotates in counterclockwise and clockwise directions, as viewed in FIG. 3, the locking pawl 30a moves between the locking position (as shown by the broken line in FIG. 3) and the lock releasing position (as shown by the solid line in FIG. 3), respectively. In the locking position, the locking pawl 30a engages the rib 20a, while in the lock releasing position, the locking pawl 30a does not engage the rib 20b, as respectively shown by the broken and solid lines in FIG. 2.

The intermediate lever 28 is formed shorter than the locking lever 30, and is provided with a pressed section 28a at a free end thereof. The pressed section 28a is pressed by the engaging projection 26a which rotates counterclockwise, as viewed in FIG. 3. The intermediate lever 28 is provided with spring hooks 28c, 28d near the pivot 32. Each of the spring hooks 28c, 28d is disposed at a position in front of the spring hook 30c of the locking lever 30 in the clockwise direction as viewed in FIG. 3.

The intermediate lever 28 is further provided with an engaging projection 28b, between the arm of the intermediate lever 28, which comprises the pressed section 28a, and the spring hook 28c. The engaging projection 28b is elongated in the radial direction of the pivot 32, and is bent toward the sliding cover 20, so as to be engaged with a bottom surface 30b of the locking lever 30. The spring hook 28d of the intermediate lever 28, which rotates counterclockwise as viewed in FIG. 3, contacts an index projection 42 at a position adjacent to a pivot 36 of the unit plate 41. The index projection 42 is formed such that when the locking pawl 30a moves together with the intermediate lever 28, the index projection 42 guides the locking pawl 30a to the locking position.

A torsion spring 38 having two legs projecting therefrom comprises a coil section. The coil section is supported by the pivot 32. Each of the legs of the coil section is hooked to the spring hooks 28c and 30c, respectively. In such a manner, the torsion spring 38 applies rotative forces to the spring hooks 28c and 30c respectively, in a direction that biases the spring hooks 28c and 30c toward each other. Thus the rotative forces are respectively applied to the intermediate lever 28 and the locking lever 30, so that the pressed section 28a and the locking pawl 30a may be moved away from each other. However, since the bottom surface 30b of the locking lever 30 comes into contact with the engaging projection 28b of the intermediate lever 28, the widest opening angle between the locking lever 30 and the intermediate lever 28 is limited to the amount shown in FIG. 3. With such an arrangement, the locking lever 30 and the intermediate lever 28 are connected to each other, via the torsion spring 38 and the engaging projection 28b, so that the locking lever 30 and the intermediate lever 28 further comprise a clutch mechanism.

Specifically, when the rotative resistance (resistance to movement) applied to the locking lever 30 is less than a predetermined value, through the clutch mechanism thereof, the locking lever 30 and the intermediate lever 28 rotatively move as a whole in the lock releasing direction (in the clockwise direction as viewed in FIG. 3). When the applied rotative resistance exceeds the predetermined value, the clutch mechanism actuates the intermediate lever 28 to move rotatively relative or opposite to the locking lever 30 to actuate the intermediate lever 28 to run idle. It is possible to provide any engaging projection capable of engaging the upper surface of the intermediate lever 28, on the upper surface of the locking lever 30. Such an engaging projection may serve, instead of the engaging projection 28b as discussed above, to restrict the relative rotation of the locking lever 30 and the intermediate lever 28 within a predetermined angle.

The pivot 36 and a pivot 44 are positioned adjacent to the spring hook 28d on the unit plate 41. A torsion spring 34 comprises a coil section, and the pivot 36 penetrates the coil section of the torsion spring 34. Each leg of the torsion spring 34 is hooked to the spring hook 28d and the pivot 44, respectively. In such a manner, the torsion spring 34 applies rotative force to the locking lever 30, via the intermediate lever 28, towards the locking position (in the counterclockwise direction as seen in FIG. 3).

Figure 4:
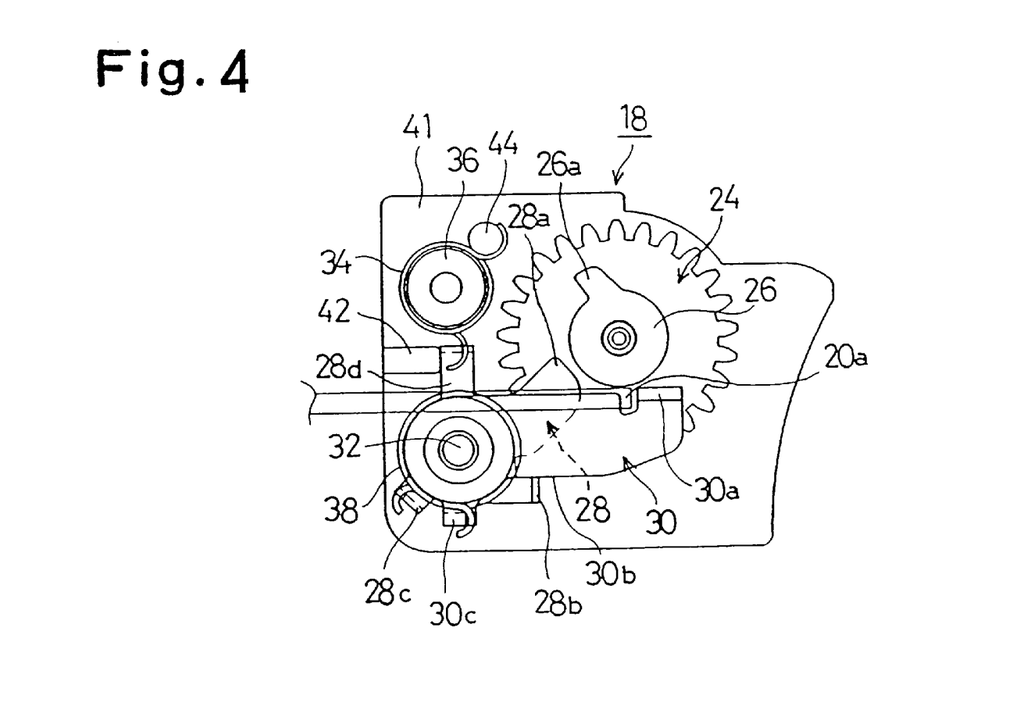
FIG. 4 is an enlarged schematic view of the device for restricting a movement of the sliding cover shown in FIG. 1, in a locked state.

The spring constant of the torsion spring 34 is set so as to apply less rotative force than the torsion spring 38 applies. Thus, the torsion spring 34 rotates, as long as the locking lever 30 is in a free state, both the levers 28 and 30 in a counterclockwise direction as seen in FIG. 4. Accordingly, the locking pawl 30a is positioned on the moving track of the rib 20a on the rear side of the sliding cover 20. In this position, a space is generated between the locking pawl 30a and the rib 20a. Such a space permits the sliding cover 20 to move towards the closed position, so that the actuating switch may be turned OFF.

Figure 5:
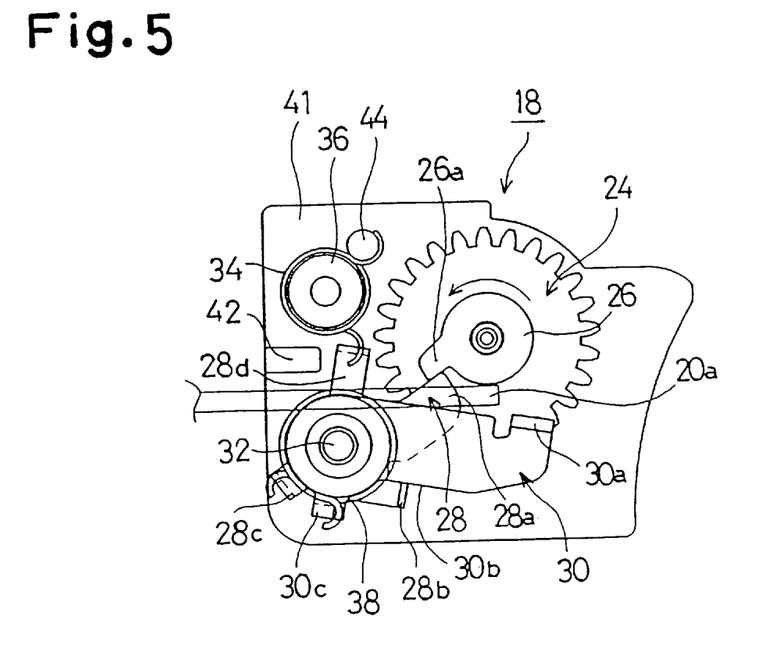
FIG. 5 is an enlarged schematic view of the device for restricting a movement of the sliding cover shown in FIG. 1, in a locking released state.

If the intermediate lever 28 is depressed when the locking lever 30 is in a free state, both the levers 28 and 30 rotate simultaneously in a clockwise direction, as seen in FIG. 5, so that the locking pawl 30a moves away from the moving track of the rib 20a.

An operation of the sliding cover restricting device of the first embodiment of the present invention, will now be described.

As illustrated in FIG. 5, when the camera 10 is in the non-operational state (when the photographing lens 14 is at the retracted position and the sliding cover 20 is at the fully-closed position), the cam attached gear 24 is rotated counterclockwise, and the engaging projection 26a presses against the pressed section 28a. Accordingly, the locking pawl 30a is moved away from the moving track of the rib 20a. In this state, when the sliding cover 20 is moved towards the fully-opened position, the unillustrated actuating switch is turned ON. Accordingly, the zoom motor 16a is driven, and the photographing lens 14 is advanced to the photographing position.

Due to the actuation of the zoom motor 16a, the zoom interlocking gear 22a rotates clockwise as viewed in FIG. 3, and when the photographing lens 14 is at the photographing position, the zoom interlocking gear 22b rotates the cam attached gear 24 clockwise via the idle gear 22b. Thus, the engaging projection 26a of the cam 26 releases the pressed section 28a of the intermediate lever 28. Accordingly, the locking lever 30 rotates counterclockwise together with the intermediate lever 28 and the spring hook 28d of the intermediate lever 28 as seen in FIG. 3, until the spring hook 28d comes into contact with the index projection 42. The locking pawl 30a is then moved on the moving track of the rib 20b, which is moved to the fully-opened position. This is a locking state, and the camera 10 is ready for photography.

After completion of photography, when the sliding cover 20 is moved toward the closed position, the unillustrated switch is turned OFF. Thus, the zoom motor 16a is driven, and the photographing lens 14 is retracted to the retracted position. During the retracting movement, the zoom interlocking gear 22a rotates counterclockwise, as viewed in FIG. 3, and the cam attached gear 24 is rotated, via the idle gear 22b, counterclockwise as viewed in FIG. 4. Accordingly, the engaging projection 26a of the cam 26 depresses the pressed section 28a of the intermediate lever 28, which causes the locking lever 30 to rotate clockwise together with the intermediate lever 28, as seen in FIG. 4, against the torsion spring 34. Thus the locking pawl 30a is moved away from the moving track of the rib 20b which is moved to the fully-opened position, as shown in FIG. 5.

During the movement of the photographing lens 14 from the photographing position to the retracted position, if a photographer mistakenly applies an excessive force to the sliding cover 20 to close it, the rib 20a of the sliding cover 20 comes into contact with the locking pawl 30a, and the locking pawl 30a is pressed at the locking position. In such a state, when the photographing lens 14 reaches the retracted position, a moving resistance P applied to the locking lever 30 exceeds a predetermined value, and the engaging projection 26a of the cam 26 depresses the pressed section 28a of the intermediate lever 28.

Figure 6:
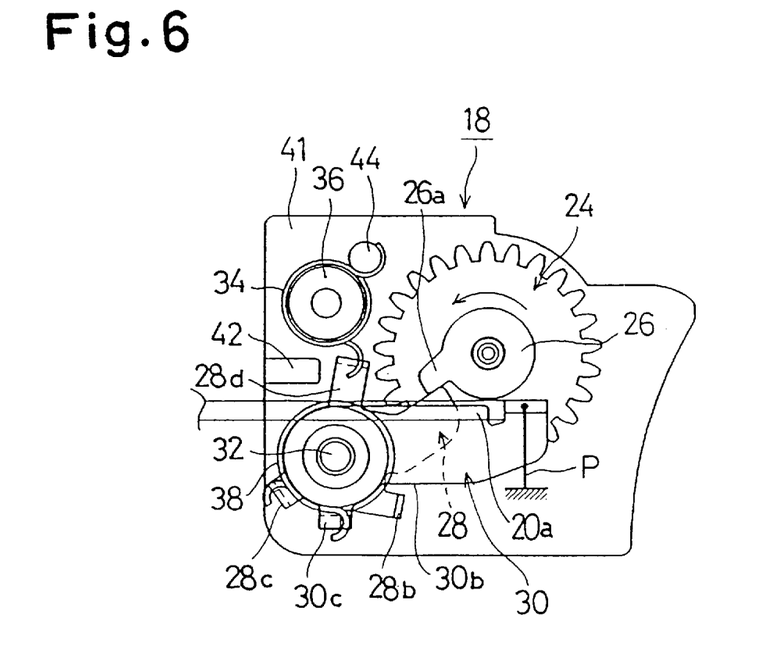
FIG. 6 is an enlarged schematic view of the device for restricting a movement of the sliding cover shown in FIG. 1, wherein a locking pawl held at a locking position is about to be moved to a locking released position.

However as described above, since the locking lever 30 and the intermediate lever 28 are connected to each other via the torsion spring 38 and the engaging projection 28b, the rotative resistance through the engaging projection 26a of the cam 26 overcomes the rotative force of the torsion spring 38. Thus the intermediate lever 28 is rotatively moved relative to the locking lever 30, that is the intermediate lever 28 runs idle, as shown in FIG. 6. Therefore, any operational error or damage as experienced with the conventional device for restricting a movement of the sliding cover of the camera does not occur.

As described above, according to a first embodiment of the present invention, when a photographer mistakenly applies an excessive force when the sliding cover is in the fully-opened state, it is possible to provide a sliding cover movement restricting device which certainly avoids any operational error or damage owing to an excessive load applied to the interlocking device such as a gear train or the driving system of the photographing lens.

FIGS. 7 through 13 illustrate a sliding cover movement restricting device according to a second embodiment of the present invention.

Figure 7:
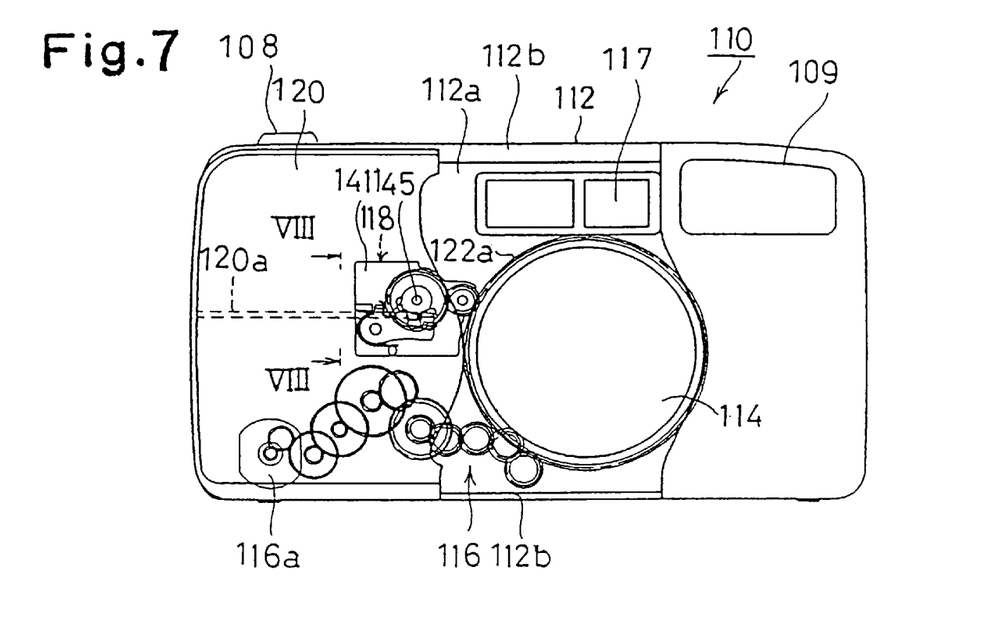
FIG. 7 is a front elevational view of a camera having a device for restricting a movement of a sliding cover, according to a second embodiment of the present invention.

FIG. 7 shows a front elevational view of a capsule-type camera 110 having a sliding cover 120 in a fully-opened state. The sliding cover 120 covers a photographing lens 114 when the photographing lens 114 is in a non-operational state. When the sliding cover 120 is opened, an unillustrated actuating switch (main switch) is turned ON, and accordingly the photographing lens 114 is advanced to the photographing position. Furthermore, if the sliding cover 120 is moved from the open position toward the closed position, the actuating switch is turned OFF, and accordingly the photographing lens 114 is moved to the retracted position.

The camera 110 has a camera body 112. The photographing lens 114, a strobe device 109 and a finder window 117 are provided on a front wall 112a of the camera body 112. The camera 110 is also provided with a shutter button 108 on an upper surface thereof.

Guide grooves 112b are provided on upper and lower portions of the front wall 112a, in a direction perpendicular to an optical axis of the photographing lens 114, that is, along a longitudinal direction of the front wall 112a. The sliding cover 120 is guided, at upper and lower ends thereof, by the guide grooves 112b such that the sliding cover 120 is capable of moving in the direction perpendicular to the optical axis of the photographing lens 114. Accordingly, the sliding cover 120 can move between two positions, a fully-closed position at which the sliding cover 120 covers the photographing lens 114 at the retracted position, and the fully-opened position at which the photographing lens 114 is uncovered.

The sliding cover 120 is engaged by a predetermined force of an unillustrated click-stop device at both the fully-opened and the fully-closed positions. A force greater than the predetermined force is necessary to move the sliding cover 120 from either the fully-opened position to the fully-closed position, or from the fully-closed position to the fully-opened position.

The sliding cover 120 is provided with a rib (i.e., a locking portion) 120a which is positioned at substantially a center of the vertical direction of a rear surface of the sliding cover 120, and is elongated in the longitudinal direction of the front wall 112a of the camera body 112.

A large diameter zoom interlocking gear 122a is provided in the camera body 112 surrounding the photographing lens 114. The rotational axis of the zoom interlocking gear 122a coincides with the optical axis of the photographing lens 114. The camera body 112 is further provided with a zoom motor 116a and a zoom gear train 116. The zoom gear train 116 transmits a rotation of the zoom motor 116a to the zoom interlocking gear 122a to actuate a forward or rearward movement of the photographing lens 114 in the optical axis direction. Thus a zooming operation of the photographing lens 114 can be performed.

Further, similar to the camera 10 of the first embodiment, the camera body 112 is provided with a device for restricting the movement of the sliding cover 120. This device will hereinafter be referred to as a sliding cover movement restricting device 118. The sliding cover movement restricting device 118 is positioned on the same side of the camera body 112 as the sliding cover 120 when the sliding cover 120 is at the fully-opened position. When the sliding cover 120 is positioned at the fully-opened position, the sliding cover movement restricting device 118 either locks or releases the sliding cover 120, according to a movement of the photographing lens 114.

Figure 8:
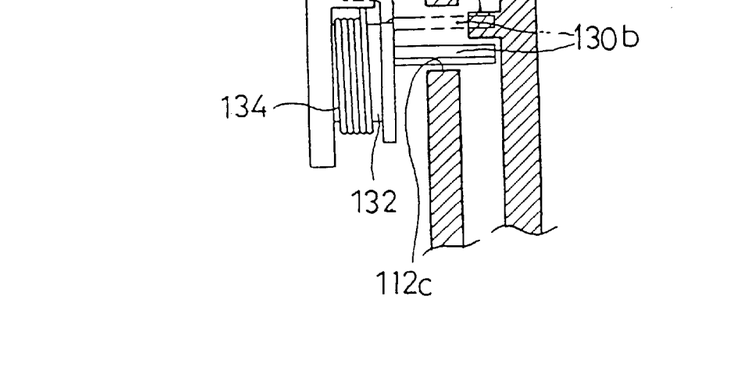
FIG. 8 is a longitudinal sectional view taken along the line VIII—VIII of FIG. 7.

The sliding cover movement restricting device 118 is provided with a unit plate 141. The unit plate 141 is fixed to the camera body 112 adjacent to the photographing lens 114. Specifically, the unit plate 141 is fixed to an inner surface of the front wall 112a of the camera body 112, as shown in FIG. 8. An idle gear 122b and a locking operational gear 124 are rotatively supported on the unit plate 141. The idle gear 122b engages the zoom interlocking gear 122a. The locking operational gear 124, having a diameter larger than the idle gear 122b, engages the idle gear 122b. The unit plate 141 further serves to pivot a locking lever 130 via a pivot 132. An index projection 142 and a pivot 144 are formed, adjacent to the pivot 132, projecting from the unit plate 141.

Figure 9:
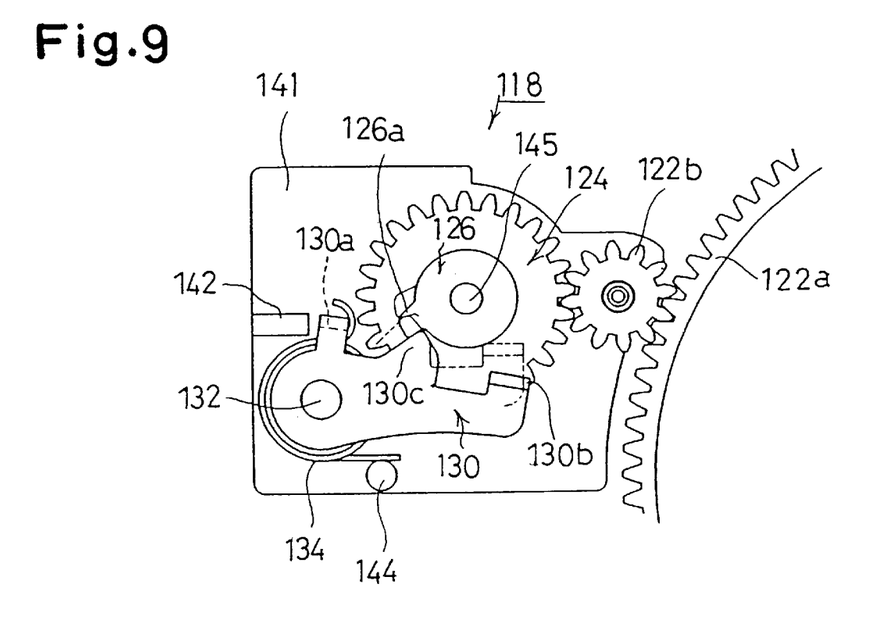
FIG. 9 is an enlarged schematic view of the device for restricting a movement of the sliding cover shown in FIG. 7.

The locking lever 130 is provided with a locking pawl 130b and a spring hook 130a. The locking pawl 130b is positioned at a free end of an arm of the locking lever 130. The spring hook 130a is positioned near the pivot 132. The spring hook 130a projects perpendicularly from the arm (main section) of the locking lever 130. The locking lever 130 is provided with a pressed section 130c, between the spring hook 130a and the locking pawl 130b which are disposed at the main section of the locking lever 130. The pressed section 130c is depressed by an engaging projection 126a of a cam member 126, an operation of which will be discussed in detail below.

A torsion spring 134 having two legs projecting therefrom comprises a coil section. The coil section is supported by the pivot 132. Each of the legs of the torsion spring 134 is hooked to the spring hook 130a and a pivot 144, respectively. In such a manner, the torsion spring 134 constantly applies rotative force to the locking lever 130 in the counterclockwise direction, as viewed in FIG. 9. Accordingly, in a free state, the spring hook 130a comes into contact with the index projection 142.

The locking pawl 130b is bent and elongated toward the front of the camera 110 (toward the sliding cover 120), so that the locking pawl 130b may project into the path of the sliding cover 120 through a projection bore 112c which is formed on the front wall 112a, as seen in FIG. 8. When the locking lever 130 rotates counterclockwise and clockwise, as seen in FIG. 9, the locking pawl 130b moves between the locking position (as shown by the broken line in FIG. 9) and the lock releasing position (as shown by the solid line in FIG. 9). The locking pawl 130b is capable of engaging the rib 120a at the locking position, and is not engaged with the rib 120a at the lock releasing position.

The unit plate 141 is further provided with a pivot 145. The locking operational gear 124 and the cam member 126 are coaxially pivoted to the unit plate 141 via the pivot 145. The cam member 126 is provided with the engaging projection 126a so as to press the pressed section 130c.

Figure 10:
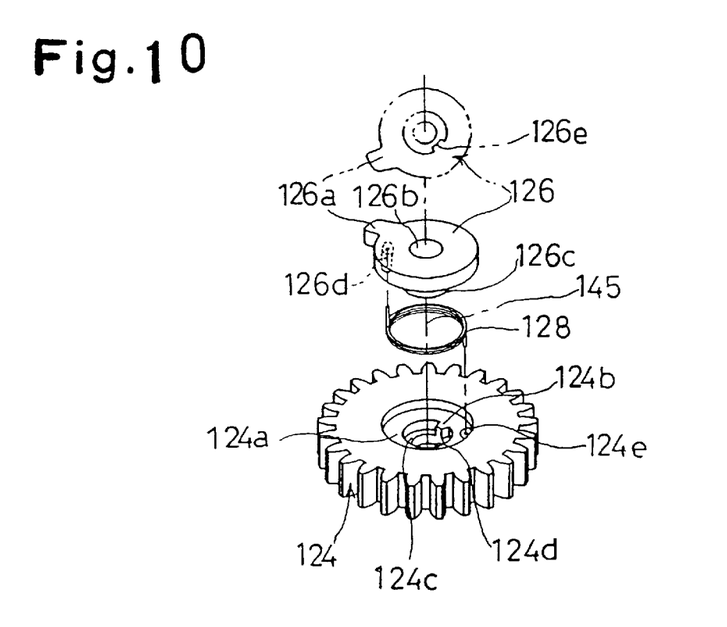
FIG. 10 is an enlarged, exploded perspective view of a clutch device used in the device for restricting a movement of the sliding cover shown in FIG. 7.

As illustrated in FIG. 10, the locking operational gear 124 is provided with a pivot bore 124d at a center thereof, which is penetrated by the pivot 145. The locking operational gear 124 is further provided with a cylindrical rotation support 124c and a cylindrical spring reception 124a. The rotation support 124c and the spring reception 124a are coaxially provided with the pivot bore 124d. The diameter of the spring reception 124a is larger than the diameter of the rotation support 124c, and the diameter of the rotation support 124c is larger than the diameter of the pivot bore 124d. A part of the inner periphery of the rotation support 124c projects into the pivot bore 124d thereof. Such a projection serves as a rotation restricting projection 124b. The rotation restricting projection 124b comprises a securing section. When the cam member 126 rotates clockwise (toward the locking position) and counterclockwise (toward the lock releasing position) as seen in FIG. 9, the rotation restricting projection 126b engages the cam member 126 at respective relative angles, according to each direction of rotation of the cam member 126. Further, a spring supporting bore 126e is formed on the spring reception 124a adjacent to the rotation restricting projection 124b. One end of a torsion spring 128 is inserted into the spring supporting bore 126e.

The cam member 126 is provided with a pivot bore 126b at a center thereof. The pivot 145 penetrates the pivot bore 126b. The cam member 126 is further provided with the engaging projection 126a which projects approximately in the radial direction. The length of the engaging projection 126a is designed in such a manner that, when the cam member 126 and the locking operational gear 124 are coaxially pivoted, the engaging projection 126a does not jut out from the outer periphery of the locking operational gear 124.

Figure 12:
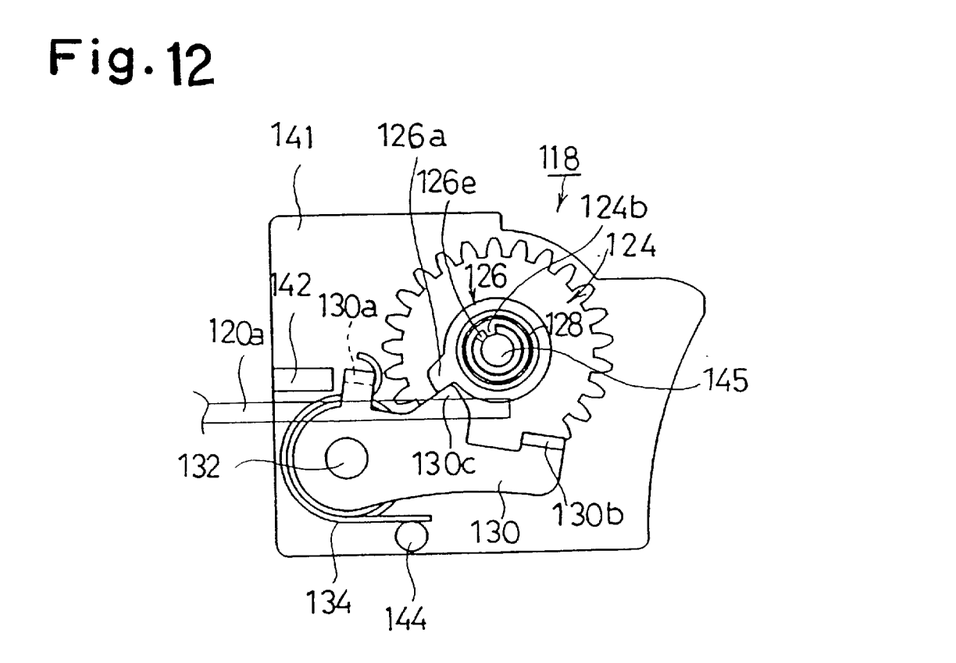
FIG. 12 is an enlarged schematic view of the device for restricting a movement of the sliding cover shown in FIG. 7, in a locking released state.
Figure 13:
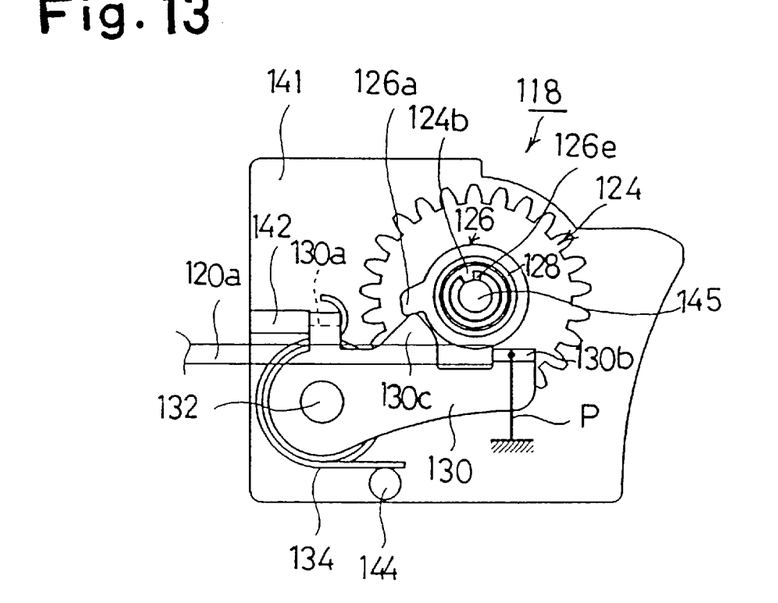
FIG. 13 is an enlarged schematic view of the device for restricting a movement of the sliding cover shown in FIG. 7, wherein a locking pawl held at a locking position is about to be moved to a locking released position.

Further; the cam member 126 is provided with a cylindrical flange 126c on the side facing the locking operational gear 124. The cylindrical flange 126c rotatively engages with the rotation supporting section 124c. The cylindrical flange 126c is provided with a notch 126e, which receives the rotation restricting projection 124b when the cylindrical flange 126c engages the rotation supporting section 124c. The notch 126e is formed so as to remain at a predetermined position in the rotative direction, when the notch 126e receives the rotation restricting projection 124b, as seen in FIGS. 12 and 13. Thus the cam member 126, which is coaxially pivoted with the locking operational gear 124, is capable of rotating by predetermined angles in clockwise and counterclockwise directions against the rotation restricting projection 124b. The cam member 126 is further provided with a spring supporting bore 126d on a rear side thereof, adjacent to the engaging projection 126a, as shown in FIG. 10. The other end of the torsion spring 128 is inserted into the spring supporting bore 126d.

The cam member 126 is mounted in the following manner. The coil section of the torsion spring 128 is inserted into the spring reception 124a. One end of the torsion spring 128 is inserted into the spring supporting bore 124e, while the other end of the torsion spring 128 is inserted into the spring supporting bore 126d. The position of the notch 126e coincides with the position of the rotation restricting projection 124b. The cylindrical flange 126c is engaged by the rotation support 124c. In such a state, the cam member 126 is mounted to the locking operational gear 124, and further the cam member 126 is pivoted to the unit plate 141 via the pivot 145.

The cam member 126 is constantly effected by a counterclockwise rotative force, as seen in FIG. 9, by the torsion spring 128. However, the rotative position of the cam member 126 relative to the locking operational gear 124 is determined according to an engagement between one end of the notch 126e and the rotation restricting projection 124b. Therefore, the torsion spring 128 maintains the locking operational gear 124 and the cam member 126 in a relative rotational state, and generally, the locking operational gear 124 and the cam member 126 are rotated together as a whole, until the cam member 126 rotates counterclockwise in FIG. 13 (towards the lock releasing position) to be engaged by the rotation restricting projection 124b. In such a state, when a force stronger than the force of the torsion spring 128 is applied to the engaging projection 126a of the cam member 126, the cam member 126 rotates clockwise as viewed in FIG. 13, relative to the locking operational gear 124. Such a relative rotation of the cam member 126 is best illustrated in FIG. 12. Accordingly, when the cam member 126 reaches the point at which the other end of the notch 126e comes into contact with the rotation restricting projection 124b, the cam member 126 stops rotating.

The spring constant of the torsion spring 134 is set so as to apply less rotative force than the torsion spring 128 applies. Thus the torsion spring 134 rotates locking lever 130 counterclockwise as viewed in FIG. 11, as long as the locking lever 130 is in a free state. Accordingly, the locking pawl 130b is positioned on the moving track of the rib 120a on the rear side of the sliding cover 120.

When the pressed section 130c is depressed during a free state of the locking lever 130, the locking lever 130 rotates clockwise, as seen in FIG. 12, and moves the locking pawl 130b away from the moving track of the rib 120a.

Further, as shown in FIG. 13, during the state in which the locking lever 130 is maintained at the locking position, when the pressed section 130c is depressed by the cam member 126 which rotates counterclockwise as viewed in FIG. 13, the locking operational gear 124 runs idle against the cam member 126. In such a state, movement of the cam member 126 is obstructed by the pressed section 130c, since the pressed section 130c is in a fixed state because of the existence of the torsion spring 128.

With such an arrangement, the rotation restricting projection 124b, the notch 126e and the torsion spring 128, comprise a clutch mechanism between the locking operational gear 124 and the cam member 126.

Specifically, when the rotative resistance (resistance to movement) applied to the locking lever 130 is less than a predetermined value, through the clutch mechanism thereof, the cam member 126 and the locking operational gear 124 rotate together as a whole. Thus the locking lever 130 rotates in the lock releasing direction (in the clockwise direction as viewed in FIG. 12). When the applied rotative resistance exceeds the predetermined value, the clutch mechanism actuates the locking operational gear 124 to move rotatively relative or opposite to the cam member 126, and actuates the locking operational gear 124 to run idle. In such an idling state, the locking lever 130 is not moved.

Figure 11:
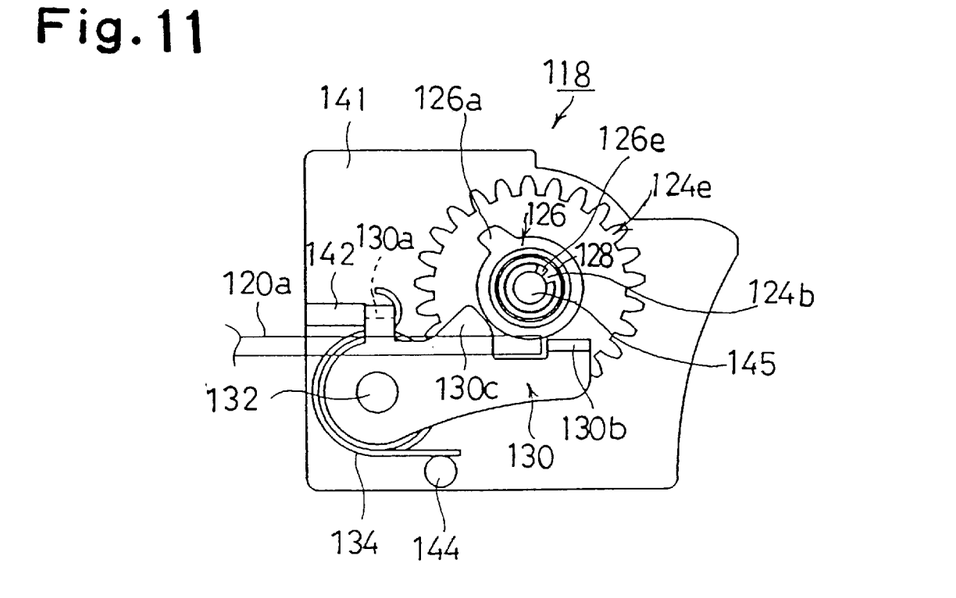
FIG. 11 is an enlarged schematic view of the device for restricting a movement of the sliding cover shown in FIG. 7, in a locked state.

As illustrated in FIG. 11, a space is defined between the locking pawl 130b and the rib 120a. The sliding cover 120 may move towards the fully-closed position in this space, so as to turn the actuating switch OFF.

The operation of the sliding cover movement restricting device of the second embodiment, will now be described. As illustrated in FIG. 12, when the camera is in the non-operational state (when the photographing lens 114 is at the retracted position and the sliding cover 120 is at the fully-closed position), the locking operational gear 124 is rotated counterclockwise, and the engaging projection 126a presses the pressed section 130c. Accordingly, the locking pawl 130b is moved away from the moving track of the rib 120a, and positioned at the lock releasing position. In such a state, when the sliding cover 120 is moved towards the fully-opened position, the unillustrated actuating switch is turned ON. Accordingly, the zoom motor 116a is driven, and the photographing lens 114 is advanced to the photographing position.

Due to the actuation of the zoom motor 116, the zoom interlocking gear 122b rotates clockwise as viewed in FIG. 9, and when the photographing lens 114 is at the advanced position, the zoom interlocking gear 122b rotates the locking operational gear 124 clockwise via the idle gear 122b. Thus, the engaging projection 126a of the cam 126 releases the pressed section 130c of the locking lever 130. Accordingly, the locking lever 130 rotates counterclockwise as seen in FIG. 11, until the spring hook 130a comes into contact with the index projection 142, so that the locking pawl 130b is moved on the moving track of the rib 120b, which is moved to the fully-opened position. This is the locking state shown in FIG. 11, in which the camera is ready to take pictures.

After completion of taking pictures, when the sliding cover 120 is moved toward the fully-closed position, the unillustrated switch is turned OFF. Thus the zoom motor 116a is driven, and the photographing lens 114 is retracted to the retracted position. Due to the actuation of the motor 116a, the zoom interlocking gear 122a rotates counterclockwise, as seen in FIG. 9, and the locking operational gear 124 is gradually rotated, via the idle gear 122b, counterclockwise as seen in FIG. 12. Accordingly, the engaging projection 126a of the cam member 126 depresses the pressed section 130c of the locking lever 130, which causes the locking lever 130 to move rotatively, clockwise as seen in FIG. 12, against the torsion spring 134. Thus, the locking pawl 130b is moved away from the moving track of the rib 120b which is moved to the fully-opened position, as shown in FIG. 12.

When the photographing lens 114 is on the way to the retracted position from the photographing position, for example, if the photographer mistakenly applies an excessive force to the sliding cover 120 to close it, the rib 120a of the sliding cover 120 comes into contact with the locking pawl 130b, thus the locking pawl 130b is pressed at the locking position. In such a state, when the photographing lens 114 reaches the retracted position, the moving resistance (the value P) applied to the locking lever 130 exceeds a predetermined value, and the engaging projection 126a of the cam 126 depresses the pressed section 130c of the locking lever 130 under such an excessive value P of the moving resistance. However, as above described, since the locking operational gear 124 and the cam member 126 are connected in the specific relation with each other via the torsion spring 128, etc. the rotative resistance through the engaging projection 126a of the cam 126 overcomes the rotative force of the torsion spring 128. Thus, the locking operational gear 124 is rotatively moved relative to the cam member 126, and the locking operational gear 124 is actuated to run idle, as shown in FIG. 13.

As above described, the sliding cover movement restricting device of the second embodiment does not cause any operational error or damage as experienced with the conventional device.

FIGS. 14 through 17 illustrate an overall construction of a sliding cover movement restricting device according to a third embodiment of the present invention.

Figure 14:
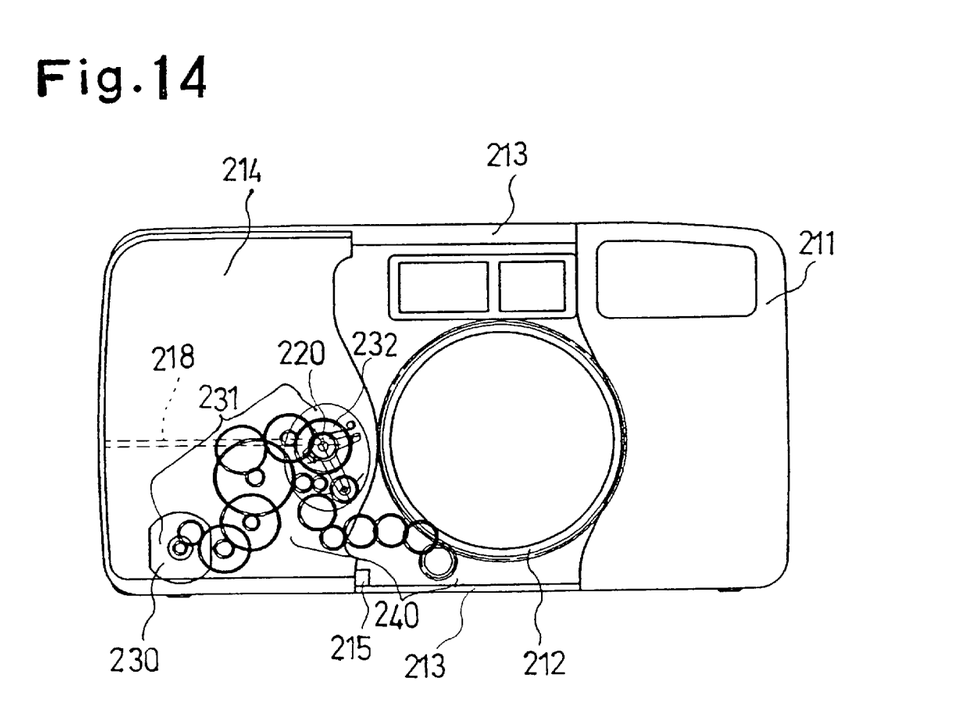
FIG. 14 is a front elevational view of a camera having a device for engaging a sliding cover, according to a third embodiment of the present invention.

As illustrated in FIG. 14, a camera body 211 is provided with a zoom lens barrel 212 at a center of the front surface of the camera body 211. The zoom lens barrel 212 is capable of moving between a retracted position and a photographing position. In the photographing position, the zoom lens barrel 212 is further moveable in a zooming range.

The camera body 212 is provided with a sliding cover 214 which covers the zoom lens barrel 212, when the zoom lens barrel 212 is at the retracted position. The sliding cover 214 can move between a fully-closed position and a fully-opened position along guide rails 213. The camera body 211 is further provided with a switch 215. The switch 215 is operated when the sliding cover 214 moving from the fully-closed position reaches a position just before the fully-opened position, and when the sliding cover 214 is moved by some amount from the fully-opened position toward the fully-closed position. FIG. 14 illustrates the state when the sliding cover 214 is fully-opened.

Figure 15:
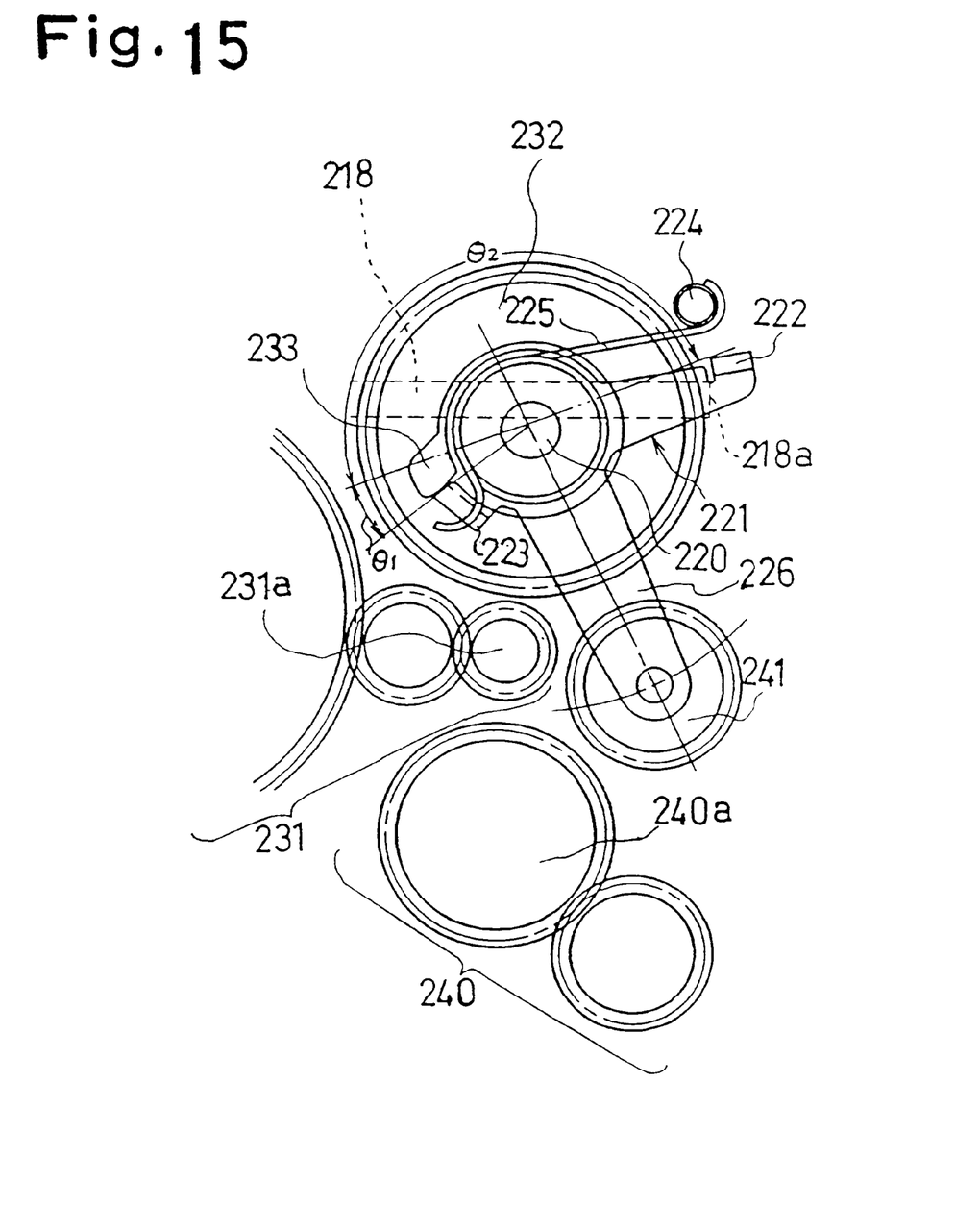
FIG. 15 is an enlarged front elevational view of essential parts used in the device of FIG. 14.
Figure 16:
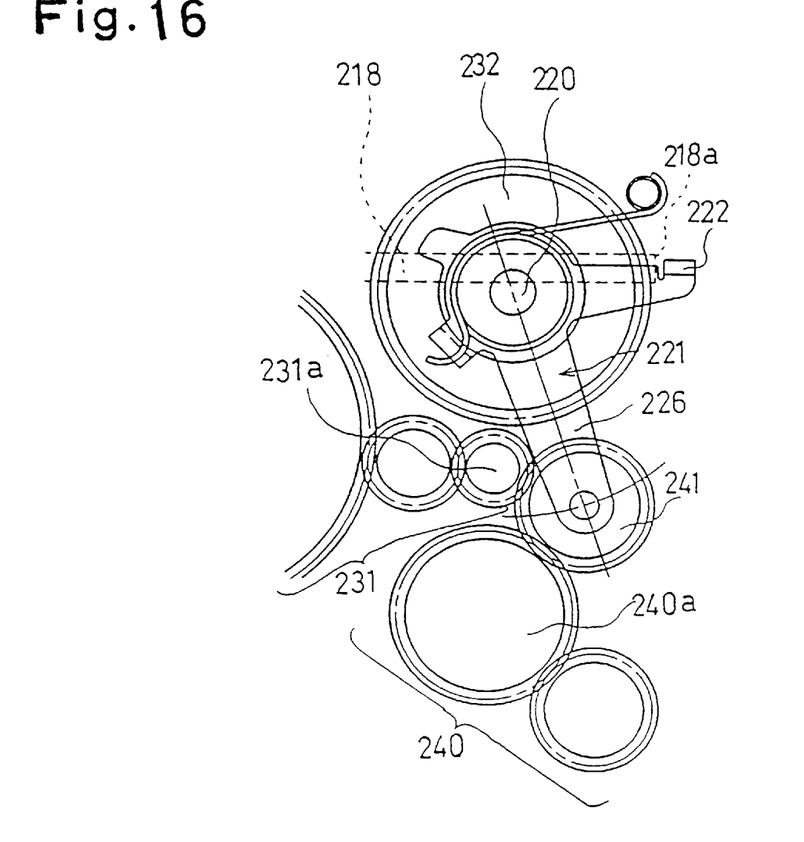
FIG. 16 is an enlarged front elevational view of essential parts used in the device of FIG. 14, in a different state from the state shown in FIG. 15.

The sliding cover 214 is provided with a rib 218, as illustrated by a broken line in FIGS. 14, 15 and 16. The rib 218 projects from a rear surface of the sliding cover 214 and is elongated in the sliding direction of the sliding cover 214. The rib 218 comprises a stopper surface 218a (see FIGS. 15 and 16) which is positioned at the end on the right (facing the zoom lens barrel 212), as seen in FIG. 14, of the inner surface of the rib 218.

As illustrated in FIG. 15, an engaging lever 221 is pivoted to the camera body 211 via a pivot 220. An engaging projection 222 is formed on the engaging lever 221, and the engaging projection 222 moves between interfering and non-interfering positions with the stopper surface 218a. When the engaging projection 222 is at the non-interfering position with respect to the stopper surface 218a, as seen in FIG. 15, it is possible to move the sliding cover 214 from the fully-opened position to the fully-closed position. On the other hand, when the engaging projection 222 is at the interfering position with respect to the stopper surface 218a, as seen in FIG. 16, it is impossible to move the sliding cover 214 from the fully-opened position to the fully-closed position. The engaging lever 221 is provided with a radial projection 223. A torsion spring 225 is provided between the radial projection 223 and a spring hooking pin 224. In such a manner, the rotative force is applied to the engaging lever 221 in such a direction that the engaging projection 222 of the engaging lever 221 interferes with the stopper surface 218a.

An actuating (zoom) motor 230 is secured to the camera body 211. The actuating motor 230 serves as an actuator commonly used for both the zoom lens barrel 212 and the engaging lever 221. An engaging lever actuating gear 232 is pivoted to the pivot 220, coaxial with the engaging lever 221, thus the engaging lever actuating gear 232 and the engaging lever 221 are capable of relative movements with respect to each other. The actuating motor 230 is connected with the engaging lever actuating gear 232. Further, as illustrated in FIG. 15, a presser projection 233 is formed at the top or bottom surface of the engaging lever actuating gear 232. The presser projection 233 comes into contact with, or detaches from, the radial projection 223 of the engaging lever 221. The presser projection 233 also moves, through rotation of the engaging lever actuating gear 232, the engaging projection 222 between the interfering and non-interfering positions with respect to the stopper surface 218a.

FIG. 15 illustrates the rotative position of the engaging lever actuating gear 232 when the sliding cover is in a fully-closed state. In such a state, when the switch 215 detects that the sliding cover 214 moved from the fully-closed position to the fully-opened position, the engaging lever actuating gear 232 rotates clockwise by an angle of θ1, as shown in FIG. 15, from the initial position as seen in FIG. 15. The angle θ2 shown in FIG. 15, represents the rotative angle of the zoom lens barrel 212. That is, the zoom lens barrel 212 rotates by an amount corresponding to the angle θ2, from the retracted position to the photographing (the wide-angle extremity position), and further, during a zooming operation, the zoom lens barrel 212 rotates by an amount corresponding to the angle θ2 between the wide-angle extremity position and the telephoto extremity position. The gear ratio of an engaging lever actuating gear train 231, which is shown in FIG. 14, is set to satisfy the above condition, and also the following equation:

$$\theta1+\theta2 \leq 360°$$

When the sliding cover 214 is moved by an amount (small amount) from the fully-opened position towards the fully-closed position, the switch 215 detects such a movement. Thus, the switch 215 actuates the engaging lever actuating gear 232 to rotate counterclockwise, as seen in FIG. 15, and the engaging lever actuating gear 232 returns to the rotative position as shown in FIG. 15.

The zoom lens barrel 212 engages with a zoom lens actuating gear train 240. As illustrated in FIGS. 15 and 16, the zoom lens actuating gear train 240 and the engaging lever actuating gear train 231 mesh, or release from meshing, with each other via a clutch gear 241. A planet arm 226 is provided as a whole unit with the engaging lever 221. The clutch gear 241 is rotatively pivoted at a free end of the planet arm 226.

When the engaging lever 221 rotatively moves clockwise from the state shown in FIG. 15, the clutch gear 241 engages a final gear 231a of the engaging lever actuating gear train 231, and also with another final gear 240a of the zoom lens actuating gear train 240, as shown in FIG. 16.

Figure 17:
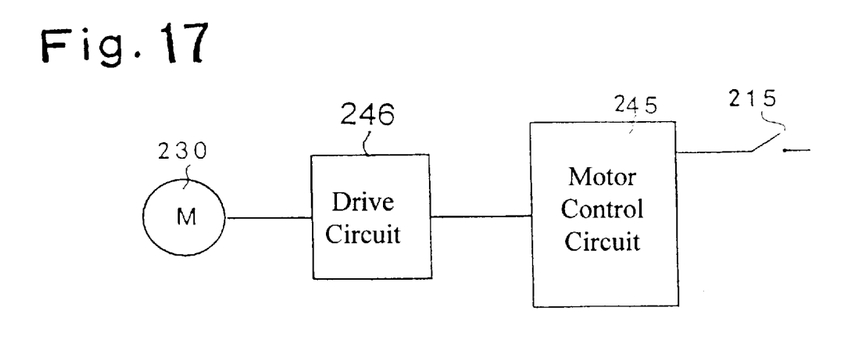
FIG. 17 is a block diagram of a controlling system of a motor used in the device of FIG. 14.

Alternately, when the engaging lever 221 rotates counterclockwise from the state shown in FIG. 16, the clutch gear 241 moves away from the respective final gears 231a and 240a. Accordingly, the meshing state between the engaging lever actuating gear train 231 (or the actuating motor 230) and the zoom lens actuating gear train 240 is released. As illustrated in FIG. 17, the engaging lever actuating gear train 231 is driven by a motor controlling circuit 245 via a driving circuit 246. The motor controlling circuit 245 receives the switching information from the switch 215.

The operation of the sliding cover movement restricting device of the third embodiment will now be described.

As illustrated in FIG. 15, when the sliding cover 214 is slid from the fully-closed position to the fully-opened position, the switch 215 is turned ON, and the motor controlling circuit 245 rotates the actuating motor 230 clockwise, for example. Accordingly, the engaging lever actuating gear 232 rotates clockwise, via the engaging lever actuating gear train 231, from the state as seen in FIG. 15.

When the engaging lever actuating gear 232 rotates by an angle of θ1, the presser projection 233 releases the radial projection 223 of the engaging lever 221. The torsion spring 225 initially applies rotative force in the clockwise direction, as seen in FIG. 15, to the engaging lever 221. According to the release of the radial projection 223 by the presser projection 233 as described above, the engaging lever 221 rotatively moves clockwise as viewed in FIG. 15. Thus, the engaging projection 222 moves to the interfering position with respect to the stopper surface 218a, as shown in FIG. 16. This is a locking position.

Through the rotational movement of the engaging lever 221, the clutch gear 241 at the free end of the planet arm 226 engages two final gears of the respective gear trains (the final gear 231a of the engaging lever actuating gear 231), and the final gear 240a of the zoom lens actuating gear train 240. In such a manner, the integrated gear train, from the actuating motor 230 to the zoom lens barrel 212, is accomplished. Before the engaging projection 222 moves to the interfering position with respect to the stopper surface 218a, the rotation of the actuating motor 230 is not transmitted to the zoom lens barrel 212. Accordingly, in such a non-interfering state of the engaging projection 222, once the sliding cover 214 is in the fully-opened state, if the user mistakenly closes the sliding cover 214, the sliding cover 214 will not interfere with the zoom lens barrel 212.

After the clutch gear 241 meshes with the engaging lever actuating gear train 231 and the zoom lens actuating gear train 240, the actuating motor 230 further rotates clockwise, and the zoom lens barrel 212 is advanced to the photographing position. After such a state, according to the zooming operation by the photographer, the actuating motor 230 is rotated clockwise and counterclockwise so as to move the zoom lens barrel 212 forwardly and rearwardly in the optical axis direction. During the movement between the retracted position and the photographing position and zooming operation of the zoom lens barrel 212, the engaging lever actuating gear 232 rotates clockwise and counterclockwise within the angle θ2, and the radial projection 223 of the engaging lever 221 is free from being depressed by the presser projection 233. Therefore, the engaging projection 222 is maintained at the interfering position with the stopper surface 218a.

A clearance space is provided between the stopper surface 218a and the engaging projection 222. If the sliding cover 214 is moved in a quantity of such a clearance space from the fully-opened position towards the fully-closed position, regardless of the operational state of the zoom lens barrel 212, the switch 215 detects such a movement of the sliding cover 214. Thus the switch 215 actuates the actuating motor 230, and the engaging lever actuating gear 232 is returned to the rotational position as shown in FIG. 15. Accordingly, while the engaging lever actuating gear 232 firstly rotates within the angle θ2, the zoom lens barrel 212 moves from the photographing position (the zooming range) to the retracted position. After such a state, while the engaging lever actuating gear 232 rotates by the angle θ1, the engaging projection 233 depresses the radial projection 223. Thus, the engaging lever 221 is rotatively moved counterclockwise as viewed in FIG. 15, and the engaging projection 222 is moved to the non-interfering position with respect to the stopper surface 218a as shown in FIG. 16. As a result, it is possible to slide the sliding cover 214 towards the fully-closed position.

The rotative position of the engaging lever actuating gear 232 may be detected, for example, by a rotary encoder. A clutch mechanism may be disposed among the engaging lever actuating gear train 231, and in such an arrangement, when the sliding cover is at the fully-closed position, the engaging lever actuating gear 232 may be set sure to return to the rotative position as shown in FIG. 15.

In the third embodiment, the zoom lens barrel 212 is designated as a photographing lens. It is of course possible that the present invention is applied to a fixed focal length lens, as long as the fixed focal length lens moves between photographing and retracted positions, and at the photographing position, the fixed focal length lens interferes with the sliding cover.

As described above, in accordance with the third embodiment, the driving system between the motor and the photographing lens is not connected until the sliding cover is opened and maintained at the locked state. Therefore, once the sliding cover is fully-opened, if the photographer mistakenly, immediately closes the sliding cover with an excessive force, the photographing lens is free from interfering with the sliding cover.

Further in the present embodiment, after the zoom lens barrel has completely moved to the retracted position, the engaging member may be moved to the released (i.e., the lock releasing) position. Therefore, before the zoom lens barrel is completely retracted, if a photographer applies an insufficient force to close the sliding cover, it is impossible to close the sliding cover. Accordingly, the photographing lens is free from interfering with the sliding cover.

What is claimed is:

1. A device for restricting a movement of a sliding cover of a camera, comprising:

a photographing lens being movable along an optical axis between an extended position and a retracted position;

a sliding cover manually movable between a fully-closed position in front of said photographing lens when said photographing lens is in the retracted position, and a fully-opened position at which said photographing lens is moved to said extended position;

a switch which actuates a motor to rotate in clockwise and counterclockwise directions according to a sliding operation of said sliding cover between said fully-closed position and said fully-opened position;

an engaging member movable between an engaging position at which said sliding cover is engaged by said engaging member at said fully-opened position and restricted from movement, and a releasing position at which said sliding cover is released and not restricted from movement;

a gear train which moves said engaging member between said engaging position and said fully-opened position in accordance with said clockwise and counterclockwise rotations of said motor; and a clutch gear which moves with a movement of said engaging member, wherein said clutch gear forms a power transmission system between said motor and said photographing lens when said engaging member moves to said engaging position, and cuts said power transmission system when said engaging member moves to said releasing position.

2. The device for restricting a movement of a sliding cover of a camera according to claim 1, wherein said extended position is a photographing position in which a photograph can be taken.

3. A device for restricting a movement of a sliding cover of a camera, comprising:

a photographing lens being movable forwardly and rearwardly along an optical axis between an extended position and a retracted position;

a sliding cover capable of being manually moved between a fully-closed position in front of said photographing lens when said photographing lens is in the retracted position, and a fully-opened position at which said photographing lens is moved to said extended position;

an engaging member which moves between an engaging position at which said sliding cover is engaged by said engaging member at said fully-opened position and restricted from movement and a releasing position at which said sliding cover is released and not restricted from movement;

an actuating motor which is used for both said photographing lens and said engaging member;

an engaging member actuating gear mechanism which moves said engaging member to said engaging position via said actuating motor, when said sliding cover is moved to said fully-opened position; and a photographing lens actuating gear mechanism which connects said actuating motor to said photographing lens via said engaging member actuating gear mechanism, when said engaging member is moved to said engaging position.

4. The device for restricting a movement of a sliding cover of a camera according to claim 3, wherein during said movement of said sliding cover from said fully-opened position to said fully-closed position, said engaging member is moved to said releasing position after said actuating motor moves said photographing lens to said retracted position.

5. The device for restricting a movement of a sliding cover of a camera according to claim 3, wherein said extended position is a photographing position in which a photograph can be taken.

* * * * *